(12) United States Patent
Wada et al.

(10) Patent No.: US 12,437,641 B2
(45) Date of Patent: Oct. 7, 2025

(54) CONTROL DEVICE, AUTOMATIC VALET PARKING FACILITY, AND METHOD FOR PERFORMING ACTION ACCORDING TO CHARACTERISTICS OF VEHICLE

(71) Applicant: DENSO CORPORATION, Kariya (JP)

(72) Inventors: Masatake Wada, Kariya (JP); Kodai Yamaura, Kariya (JP); Takamasa Hidaka, Kariya (JP)

(73) Assignee: DENSO CORPORATION, Kariya (JP)

(*) Notice: Subject to any disclaimer, the term of this patent is extended or adjusted under 35 U.S.C. 154(b) by 83 days.

(21) Appl. No.: 18/360,728

(22) Filed: Jul. 27, 2023

(65) Prior Publication Data
US 2023/0368668 A1   Nov. 16, 2023

Related U.S. Application Data

(63) Continuation of application No. PCT/JP2021/037164, filed on Oct. 7, 2021.

(30) Foreign Application Priority Data

Feb. 1, 2021   (JP) ................................ 2021-014564

(51) Int. Cl.
*G08G 1/14*        (2006.01)
*G06V 20/54*       (2022.01)
(Continued)

(52) U.S. Cl.
CPC ............. *G08G 1/143* (2013.01); *G06V 20/54* (2022.01); *G06V 20/625* (2022.01); *G08G 1/017* (2013.01);
(Continued)

(58) Field of Classification Search
CPC ........ G08G 1/143; G08G 1/017; G08G 1/149; H04W 4/40; G06V 20/54; G06V 20/625; G06V 2201/08
See application file for complete search history.

(56) References Cited

U.S. PATENT DOCUMENTS

2020/0180607 A1* 6/2020 Choi ................... G08G 1/164
2020/0361462 A1* 11/2020 Noguchi .............. G08G 1/22

FOREIGN PATENT DOCUMENTS

JP    2003-077097 A    3/2003
JP    2011054116 A     3/2011
(Continued)

*Primary Examiner* — Sisay Yacob
(74) *Attorney, Agent, or Firm* — Harness, Dickey & Pierce, P.L.C.

(57) ABSTRACT

A control device for an automatic valet parking facility includes: an in-advance obtainment unit configured to obtain, before the vehicle arrives at a specific position on a route to a parking area where automated driving for parking is performed according to a guidance of the control device, (i) characteristics information indicating characteristics of a vehicle that is about to enter the parking area and (ii) identification information of the vehicle; a specific obtainment unit configured to obtain the identification information of the vehicle located at the specific position; and an action unit configured to perform an action for a driver of the vehicle located at the specific position according to the characteristics information, among the characteristics information that has been obtained, corresponding to the identification information obtained from the vehicle located at the specific position.

11 Claims, 5 Drawing Sheets

(51) Int. Cl.
  *G06V 20/62* (2022.01)
  *G08G 1/017* (2006.01)
  *H04W 4/40* (2018.01)
(52) U.S. Cl.
  CPC .............. *G08G 1/149* (2013.01); *H04W 4/40* (2018.02); *G06V 2201/08* (2022.01)

(56) References Cited

FOREIGN PATENT DOCUMENTS

| JP | 2016-105238 A | 6/2016 |
| JP | 2016-134061 A | 7/2016 |
| JP | 2018190215 A | 11/2018 |

* cited by examiner

CONTROL DEVICE, AUTOMATIC VALET PARKING FACILITY, AND METHOD FOR PERFORMING ACTION ACCORDING TO CHARACTERISTICS OF VEHICLE

CROSS REFERENCE TO RELATED APPLICATION

This application is a continuation application of International Patent Application No. PCT/JP2021/037164 filed on Oct. 7, 2021, which designated the U.S. and claims the benefit of priority from Japanese Patent Application No. 2021-014564 filed on Feb. 1, 2021. The entire disclosure of all the above applications is incorporated herein by reference.

TECHNICAL FIELD

The present disclosure relates to a control device used in automatic valet parking facility.

BACKGROUND

An automatic valet parking facility has a parking area where parking is performed by automated driving following a guidance of a control device. For example, in an automatic valet parking facility, the control device obtains vehicle information by inputting vehicle information to a terminal installed near the entrance of the parking area.

SUMMARY

One aspect of the present disclosure is a control device for an automatic valet parking facility. The control device includes: an in-advance obtainment unit configured to obtain, before the vehicle arrives at a specific position on a route to a parking area where automated driving for parking is performed according to a guidance of the control device, (i) characteristics information indicating characteristics of the vehicle that is about to enter the parking area and (ii) identification information of the vehicle; a specific obtainment unit configured to obtain the identification information of the vehicle located at the specific position; and an action unit configured to perform an action for a driver of the vehicle located at the specific position according to the characteristics information, among the characteristics information that has been obtained, corresponding to the identification information obtained from the vehicle located at the specific position.

BRIEF DESCRIPTION OF DRAWINGS

Objects, features, and advantages of the present disclosure will become more apparent from the following detailed description made with reference to the accompanying drawings, in which.

DESCRIPTION OF EMBODIMENTS

To begin with, a relevant technology will be described first only for understanding the following embodiments. For example, a control device may be required to perform an action for the driver of a vehicle existing at a specific position on a route to a parking area according to characteristics of the vehicle. For example, when the entry restriction to the parking area is determined according to the characteristics of the vehicle, the control device may be required to notify the driver of entry restriction to the parking area regarding the above.

However, as a result of detailed studies by the inventors of the present disclosure, the following problems are found. That is, the control device may obtain information indicating the characteristics of the vehicle before the vehicle reaches a specific position. When information indicating vehicle characteristics is obtained in advance in such manner, it is difficult for the control device to identify which one of many pieces of the previously obtained information pertains to a vehicle existing at a specific position. Therefore, it is difficult for the control device to perform an action for the driver of the vehicle existing at the specific position based on the information obtained in advance.

It is, in one aspect, one of objectives of the present disclosure to provide a technology that enables to perform an action according to characteristics of a vehicle, for a driver of a vehicle existing at a specific position when information indicating the characteristics of the vehicle is obtained in advance.

One aspect of the present disclosure is a control device for an automatic valet parking facility. The control device includes: an in-advance obtainment unit configured to obtain, before the vehicle arrives at a specific position on a route to a parking area where automated driving for parking is performed according to a guidance of the control device, (i) characteristics information indicating characteristics of the vehicle that is about to enter the parking area and (ii) identification information of the vehicle; a specific obtainment unit configured to obtain the identification information of the vehicle located at the specific position; and an action unit configured to perform an action for a driver of the vehicle located at the specific position according to the characteristics information, among the characteristics information that has been obtained, corresponding to the identification information obtained from the vehicle located at the specific position.

Another aspect of the present disclosure is a method for performing an action according to characteristics of a vehicle. The method is implemented by a control device for an automatic valet parking facility. The method includes: before the vehicle arrives at a specific position on a route to a parking area where automated driving for parking is performed according to a guidance of the control device, obtaining (a) characteristics information indicating characteristics of the vehicle that is about to enter the parking area and (b) identification information of the vehicle; obtaining the identification information of the vehicle located at the specific position; and performing an action for a driver of the vehicle located at the specific position according to the characteristics information, among the characteristics information that has been obtained, corresponding to the identification information obtained from the vehicle located at the specific position.

Yet another aspect of the present disclosure is a control device for an automatic valet parking facility. The control device includes at least one processor programmed to: obtain, before the vehicle arrives at a specific position on a route to a parking area where automated driving for parking is performed according to a guidance of the control device, (i) characteristics information indicating characteristics of the vehicle that is about to enter the parking area and (ii) identification information of the vehicle; obtain the identification information of the vehicle located at the specific position; and perform an action for a driver of the vehicle located at the specific position according to the characteristics information, among the characteristics information that has been obtained, corresponding to the identification information obtained from the vehicle located at the specific position.

According to such a configuration, when information indicating the characteristics of the vehicle is obtained in advance, the control device can perform an action according to the characteristics of the vehicle for the driver of the vehicle existing at the specific position.

Next, an exemplary embodiment of the present disclosure is described below with reference to the drawings.

1. Configuration (1-1. Automatic Valet Parking Facility)

Figure 1:
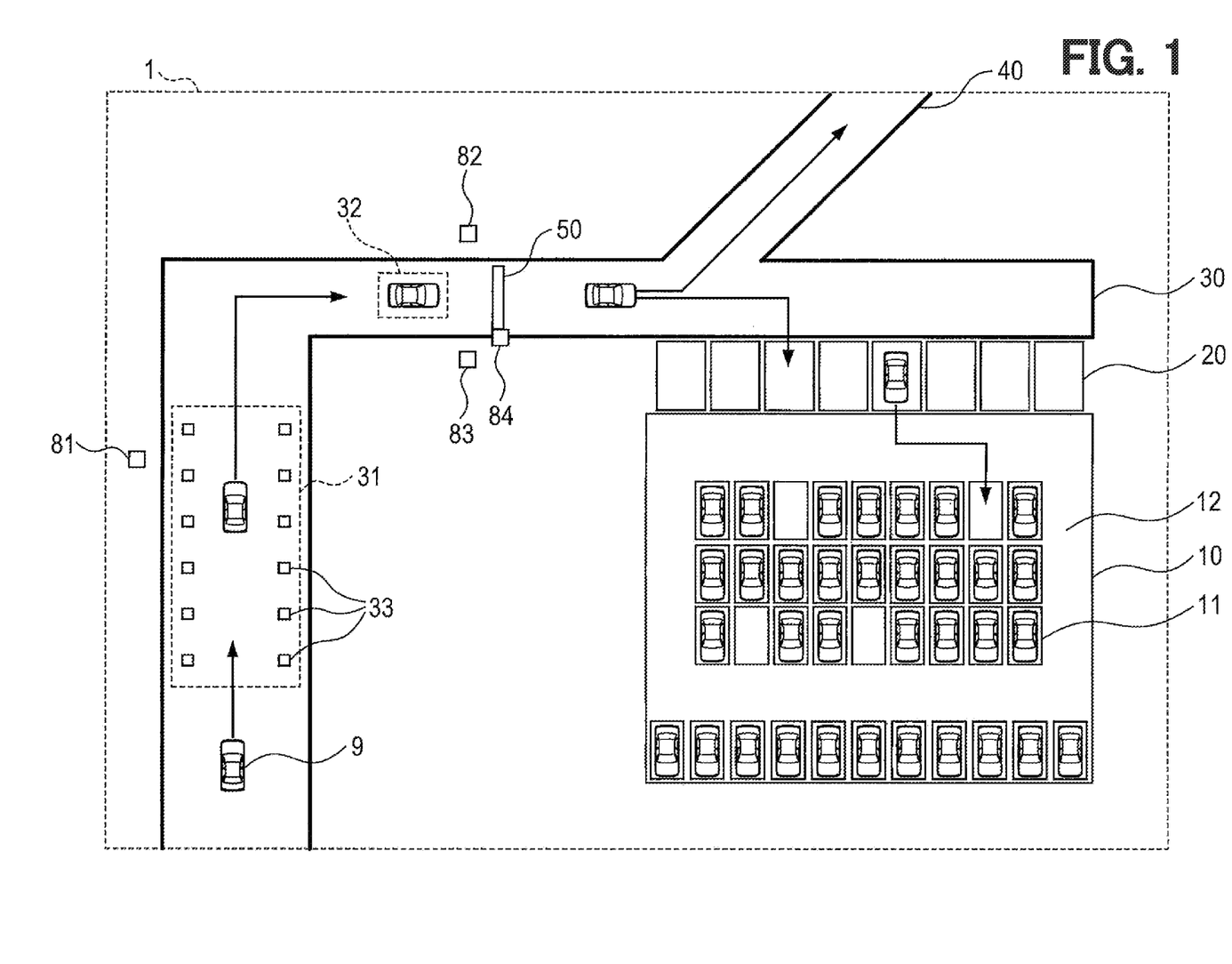
FIG. 1 is an explanatory diagram showing a configuration of an automatic valet parking facility.

An automatic valet parking facility 1 shown in FIG. 1 includes a parking area 10, plural vehicle rooms 20, a road 30, a fork road 40, and a gate 50.

The parking area 10 is an area in the automatic valet parking facility 1 where parking is performed by automated driving according to the guidance of a control device 60, which is described later. The parking area 10 includes a plurality of parking lots 11 and aisles 12. The parking lot 11 is an area for parking a vehicle 9. The aisle 12 is an area that can be selected as a guidance route by the control device 60 when the vehicle 9 is parked in the parking lot 11.

A plurality of vehicle rooms 20 is an area where a user of the automatic valet parking facility 1 (hereinafter simply referred to as a user) gets off from the vehicle 9 before automated driving in the parking area 10 is started. The vehicle room 20 has a size that can accommodate one vehicle 9. A plurality of vehicle rooms 20 are arranged side by side so that each of them is adjacent to the parking area 10. The vehicle 9 that has entered the vehicle room 20 can proceed to the parking area 10 after the user gets off. Note that the user includes the driver of the vehicle 9. Further, the plurality of vehicle rooms 20 may also serve as an area where the user gets on the vehicle 9 after the automated driving is performed in the parking area 10.

The dedicated road 30 is a road that connects the outside of the automatic valet parking facility 1 to a plurality of vehicle rooms 20. The vehicle 9 can enter one of the plurality of vehicle rooms 20 from outside the automatic valet parking facility 1 through the dedicated road 30 by the user's driving, that is, manual driving. The dedicated road 30 is included in the route to the parking area 10.

The fork road 40 is a road branched from the dedicated road 30 and connected to the outside of the automatic valet parking facility 1. The fork road 40 in the present embodiment is connected to a general parking facility outside the automatic valet parking facility 1 (not shown). The term "general parking facility" as used in the present embodiment means an area where parking is performed by the user's driving. The vehicle 9 can be driven from the dedicated road 30 to the fork road 40 and enter the general parking facility.

A branch point to the fork road 40 in the present embodiment is provided at a position closer to the vehicle room 20 than the gate 50 on the dedicated road 30. Although the fork road 40 in the present embodiment is used when the vehicle 9 heads for the general parking facility, the fork road 40 may also be used by the vehicle 9, for example, to exit the automatic valet parking facility 1 after leaving the parking area 10.

The gate 50 is an openable gate installed on the dedicated road 30. The gate 50 has a structure such as a bar, a chain, a fence, a pole, or the like, which can physically prevent the vehicle 9 from traveling on the dedicated road 30. A state in which the gate 50 is open refers to a state in which the vehicle 9 is not hindered from traveling on the dedicated road 30 by a bar or the like. That is, the vehicle 9 can pass through the gate 50 when the gate 50 is open. A state in which the gate 50 is closed refers to a state in which the vehicle 9 is prevented from traveling on the dedicated road 30 by a bar or the like. That is, the vehicle 9 cannot pass through the gate 50 when the gate 50 is closed.

The dedicated road 30 includes a position estimation area 31 and a gate front area 32 at a position before the gate 50, that is, at a position farther away from the gate 50 than the plurality of vehicle rooms 20. The position estimation area 31 is provided at a position further before the gate front area 32, that is, at a position farther away from the gate front area 32 than the plurality of vehicle rooms 20. Therefore, the vehicle 9 heading for the parking area 10 passes through the position estimation area 31, the gate front area 32, and the gate 50 in this order.

The position estimation area 31 is an area for the vehicle 9 to estimate its own position while it is in a traveling state. Also, the position estimation area 31 is an area for the control device 60 to measure the position of the vehicle 9 using a road camera 81 to be described later. As is described later, the control device 60 uses a measurement result of the position of the vehicle 9 to calculate a dynamic estimation accuracy. Therefore, the position estimation area 31 can also be called as an area for the control device 60 to calculate the dynamic estimation accuracy of the vehicle 9. The dynamic estimation accuracy means an accuracy of the position of the vehicle 9 estimated by the vehicle 9 itself while the vehicle 9 is in a traveling state.

A plurality of markers 33 are provided in the position estimation area 31. The plurality of markers 33 are drawn on the road surface so as to line up along the traveling direction of the vehicle 9 in the position estimation area 31. Although an interval between the markers 33 is not particularly limited, the plurality of markers 33 in the present embodiment are provided at regular intervals. Note that the number of vehicles 9 traveling in the position estimation area 31 at a certain point in time is not limited to one, and two or more vehicles 9 may be traveling in the position estimation area 31 at the same time.

The travel speed of the vehicle 9 may be regulated in the position estimation area 31. Specifically, the travel speed of the vehicle 9 in the position estimation area 31 may be regulated so that the vehicle 9 travels in the position estimation area 31 at a low speed close to the speed during automated driving in the parking area 10. When the control device 60 calculates the dynamic estimation accuracy, it is possible to calculate the dynamic estimation accuracy more accurately by using the position of the vehicle 9 estimated by the vehicle 9 itself while the vehicle 9 is in a traveling state at a low speed.

The gate front area 32 is an area located immediately before the gate 50 on the dedicated road 30. One vehicle 9 can be stopped in the gate front area 32. When the vehicle 9 reaches the gate front area 32, the gate 50 is in a closed state and the vehicle 9 temporarily stops in the gate front area 32. Then, in the gate front area 32, a display regarding restrictions on entering the parking area 10 is provided to the user in the vehicle 9.

As is described in detail later, in the present embodiment, entry of the vehicle 9 into the parking area 10 is restricted when the dynamic estimation accuracy does not satisfy a predetermined reference accuracy. That is, the display given to the user in the gate front area 32 differs depending on the dynamic estimation accuracy of the vehicle 9. Therefore, the position estimation area 31 is provided in front of the gate front area 32 on the dedicated road 30 so that the dynamic estimation accuracy is calculated when the vehicle 9 reaches the gate front area 32. After the display is made in the gate front area 32 and the gate 50 is opened, the user drives the vehicle 9 toward the vehicle room 20 or the general parking facility according to the display. The gate front area 32 corresponds to a specific position on the route to the parking area 10. The specific position can also be referred to as a passing point through which the vehicle 9 about to enter the parking area 10 passes after passing through an area for calculating the dynamic estimation accuracy.

(1-2. Control System)

Figure 2:
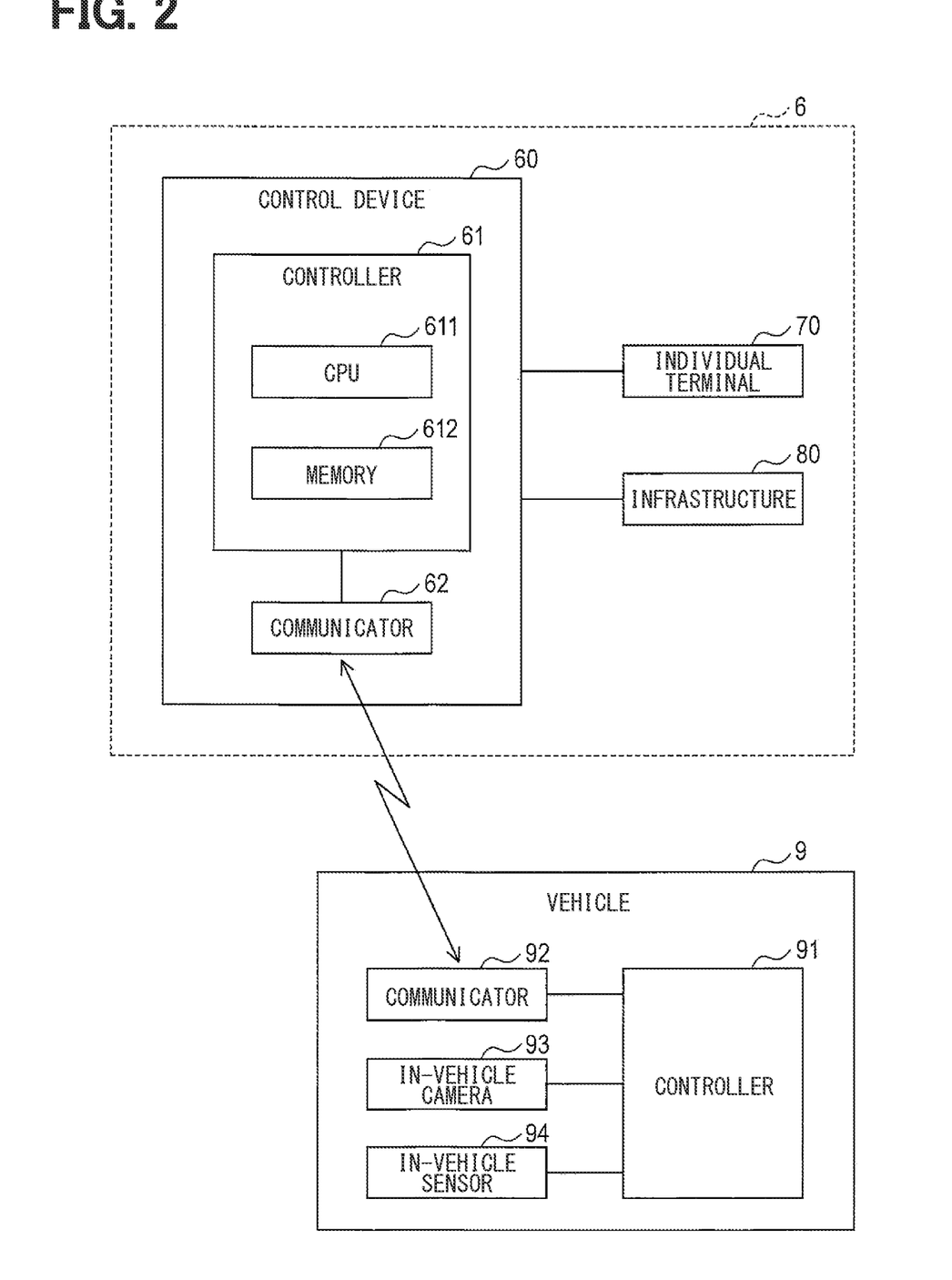
FIG. 2 is a block diagram showing a configuration of a control system and a vehicle.

A control system 6 shown in FIG. 2 is a system used in the automatic valet parking facility 1. The control system 6 includes the control device 60, a plurality of individual terminals 70 and an infrastructure 80.

The control device 60 includes a controller 61 and a communicator 62. The controller 61 includes a microcomputer having a CPU 611 and a semiconductor memory such as ROM or RAM (hereinafter referred to as memory 612). Each function of the controller 61 is implemented by the CPU 611 executing a program stored in a non-transitory, tangible recording medium. In this example, the memory 612 corresponds to a non-transitory, tangible recording medium. A method corresponding to the program is performed when the program is executed. Note that the controller 61 may include one microcomputer, or may include a plurality of microcomputers. The communicator 62 can wirelessly communicate with the vehicle 9.

Each of the plurality of individual terminals 70 is associated with one vehicle room 20. Each individual terminal 70 is installed in the corresponding vehicle room 20 or its vicinity. The individual terminal 70 receives user operations. Examples of the user operation may include an entrance request operation and user identification information input. Further, the individual terminal 70 has a display unit and displays information for the user.

The infrastructure 80 is equipment provided in advance in the automatic valet parking facility 1. The infrastructure 80 includes a plurality of sensors provided in the automatic valet parking facility 1. The plurality of sensors are, for example, cameras, lidars, and the like. The plurality of sensors are attached to the ceiling or wall surface of the parking area 10 or the vehicle room 20, for example. The plurality of sensors also include those installed on or near the dedicated road 30, such as the road cameras 81 and 82 shown in FIG. 1.

The road cameras 81 and 82 are cameras capable of capturing images of the vehicle 9. Specifically, the road camera 81 is installed in or near the position estimation area 31. The road camera 81 images the vehicle 9 existing in the position estimation area 31. Further, the road camera 82 is installed in the gate front area 32 or its vicinity. The road camera 82 images the vehicle 9 existing in the gate front area 32.

The control device 60 can obtain the identification information of the vehicle 9 using the road cameras 81 and 82. Specifically, the control device 60 in the present embodiment obtains information indicating a vehicle identification number of the vehicle 9 as the identification information of the vehicle 9 from the images captured by the road cameras 81 and 82. More specifically, the control device 60 obtains information indicating a vehicle registration number written on a license plate of the vehicle 9 from the images captured by the road cameras 81 and 82, and inquires of a vehicle management center (not shown) about the vehicle registration number. The vehicle management center transmits information indicating a vehicle identification number (for example, VIN) corresponding to the vehicle registration number to the control device 60. The control device 60 receives information indicating the vehicle identification number from the vehicle management center. Note that if a database indicating the correspondence between the vehicle registration number and the vehicle identification number is prepared in advance in the memory 612, the control device 60 may obtain, after obtaining information indicating the vehicle registration number of the vehicle 9 from the images captured by the road cameras 81 and 82, the vehicle identification number corresponding to the vehicle registration number of the vehicle 9 by using such database. The control device 60 can also measure the position of the vehicle 9 using the road cameras 81 and 82. The position of the vehicle 9 in the present embodiment is an absolute position of the vehicle 9.

The infrastructure 80 also includes a plurality of devices that perform predetermined actions for the user(s) in the vehicle 9. The plurality of devices includes, for example, a display device 83 and a gate device 84 shown in FIG. 1.

The display device 83 is installed at a position visible to the user inside the vehicle 9 in the gate front area 32. The display device 83 displays to the user inside the vehicle 9 existing in the gate front area 32 according to an instruction from the control device 60. Specifically, the display device 83 has a display, and displays an image on the display according to an instruction from the control device 60.

The gate device 84 is provided at the gate 50. The gate device 84 changes an open/close state of the gate 50 according to instructions from the control device 60. The vehicle 9 has an automatic valet parking function (hereinafter referred to as an AVP function). The AVP function includes a function of automated driving according to a guidance from the control device 60. The AVP function of the vehicle 9 is exhibited when a type of the automatic valet parking system (hereinafter referred to as AVP system) provided in the vehicle 9 and a type of the system of the control device 60 match. In other words, there are a plurality of types of AVP systems provided in the vehicle 9 and a plurality of types of systems of the control device 60, and both need to match in order for the AVP function of the vehicle 9 to be exhibited.

As shown in FIG. 2, the vehicle 9 includes a controller 91, a communicator 92, an in-vehicle camera 93 and an in-vehicle sensor 94. The controller 91 controls each part of the vehicle 9. The AVP function is implemented by a control performed by the controller 91.

The communicator 92 can wirelessly communicate with the control device 60. As a result, the vehicle 9 can obtain map information and a guidance route, which are described later, from the control device 60. The vehicle 9 uses the map information and the guidance route obtained from the control device 60, for example, when performing automated driving.

The in-vehicle camera 93 is, for example, a camera capable of imaging a front field of the vehicle 9. The vehicle 9 uses the in-vehicle camera 93 to capture an image of a range including the markers provided in the automatic valet parking facility 1. The vehicle 9 can measure relative positions of the markers and the vehicle 9 itself based on the relative positions of the markers in the captured image. Specifically, the vehicle 9 reads absolute positions of the markers from the map information obtained from the control device 60. Then, the vehicle 9 estimates the position of the vehicle 9 itself from (a) the relative positions of the markers and the vehicle 9 itself and (b) the absolute positions of the markers. When the vehicle 9 parks using the AVP function, that is, when parking by automated driving according to the guidance of the control device 60, the above-described method is repeatedly used to estimate the position of the vehicle 9 itself.

The in-vehicle sensors 94 are sensors used for parking with AVP function, automated driving, or both. The in-vehicle sensors 94 are, for example, a camera, a lidar, a millimeter wave sensor, and the like. Note that the in-vehicle camera 93 may be a part of the in-vehicle sensor 94 or may be a separate device from the in-vehicle sensor 94. The in-vehicle sensor 94 may be singular or plural.

2. Processing

First, processing related to parking and performed by the control system 6 and the vehicle 9 is described with reference to FIGS. 3 and 4.

Figure 3:
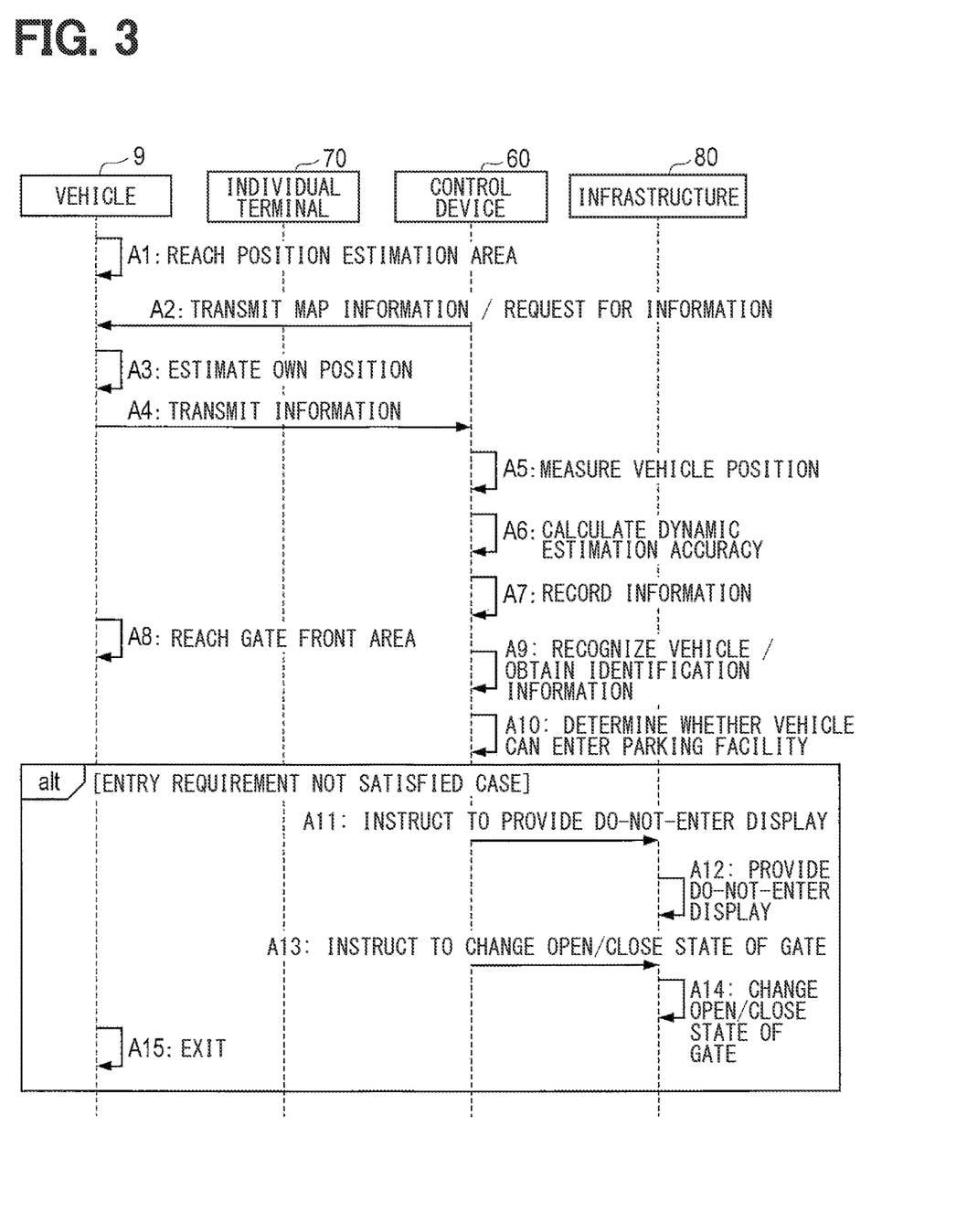
FIG. 3 is a sequence diagram showing a parking process performed by the control system and the vehicle.

At A1 shown in FIG. 3, the vehicle 9 traveling on the dedicated road 30 is driven by the user and reaches the position estimation area 31. At A2, the control device 60 transmits the map information of the position estimation area 31 to the vehicle 9 that has reached the position estimation area 31. The map information of the position estimation area 31 identifies a type and position of each of the multiple markers 33 provided in the position estimation area 31. The vehicle 9 receives the map information of the position estimation area 31 from the control device 60.

Further, the control device 60 requests the vehicle 9 that has reached the position estimation area 31 to transmit information. The information requested here includes the following information (a) to (d). (a) Identification information of the vehicle 9; (b) Information indicating the type of the AVP system that the vehicle 9 has; (c) Information indicating a position of the vehicle 9 estimated by the vehicle 9 in a traveling state; and (d) Information indicating a time when the vehicle 9 was existing at the position of the vehicle 9 related to the information (c) described above.

In the present embodiment, the information (a) is information indicating a vehicle identification number of the vehicle 9 as described above. The information (b) and (c) above corresponds to characteristics information indicating characteristics of the vehicle 9.

Note that the wireless communication between the control device 60 and the vehicle 9 at A2 may be realized by a method which uses, for example, wireless communication based on communication standards such as LTE (registered trademark) and Wi-Fi (registered trademark) for the control device 60 to transmit information to the vehicle 9 existing in the vehicle.

At A3, a position of the vehicle 9 itself is estimated while the vehicle 9 is in a traveling state in the position estimation area 31. Specifically, the vehicle 9 uses the in-vehicle camera 93 to capture an image of a range including the marker 33 provided in the position estimation area 31. Then, the vehicle 9 measures a relative position between the marker 33 and the vehicle 9 based on a relative position of the marker 33 in the captured image. Also, the vehicle 9 reads an absolute position of the marker 33 from the map information of the position estimation area 31 received from the control device 60. The vehicle 9 estimates a position of the vehicle 9 itself based on the relative position of the marker 33 and the vehicle 9 itself and the absolute position of the marker 33. This estimation method is the same as the method of estimating the position of the vehicle 9 itself when the vehicle 9 parks itself using the AVP function.

At A4, the vehicle 9 transmits the above information (a) to (d) to the control device 60. As the information (c), information indicating a position of the vehicle 9 estimated by the vehicle 9 itself at A3 is transmitted. As the information (d), information indicating a time at which the range including the marker 33 provided in the position estimation area 31 was imaged using the in-vehicle camera 93 when the vehicle 9 estimated its own position at A3 is transmitted. The control device 60 receives the above information (a) to (d) from the vehicle 9.

That the vehicle 9 estimates its own position in response to a request from the control device 60 and transmits the information to the control device 60 at A3 to A4 means that the vehicle 9 is about to enter the parking area 10.

At A5, the control device 60 uses the road camera 81 to measure the position of the vehicle 9 traveling in the position estimation area 31. Specifically, the control device 60 measures the position of the vehicle 9 using the image captured by the road camera 81 at time t1, which is the same as the time indicated by the information (d) received from the vehicle 9. If the road camera 81 did not image the vehicle 9 at time t1, the control device 60 uses an image captured at a time before time t1 and an image captured at a time after time t1, for a measurement of the position of the vehicle 9 at time t1 by interpolation calculation.

At A6, the control device 60 calculates a dynamic estimation accuracy. Specifically, the control device 60 calculates the dynamic estimation accuracy based on a difference between (i) the position of the vehicle 9 estimated by the vehicle 9 itself, indicated by the information (c) received from the vehicle 9 at A4 and (ii) the position of the vehicle 9 measured at A5. The smaller the difference is, the higher the dynamic estimation accuracy becomes.

At A7, the control device 60 records (i) the information indicating the type of the AVP system provided in the vehicle 9 received at A4 (that is, the information (b) described above) and (ii) the information indicating the dynamic estimation accuracy calculated at A6 in the memory 612 in association with the identification information of the vehicle 9 (that is, the information (a) described above). In other words, the control device 60 links (A) (i) the information indicating the type of the AVP system provided in the vehicle 9 received at A4 and (ii) the information indicating the dynamic estimation accuracy calculated at A6 with (B) the identification information of the vehicle 9 received at A4, and records them in the memory 612.

At A8, the vehicle 9 reaches the gate front area 32, and stops temporarily. At A9, the control device 60 captures the license plate of the vehicle 9 existing in the gate front area 32 using the road camera 82, and obtains the identification information of the vehicle 9 existing in the gate front area 32 (that is, the information (a) described above).

At A10, the control device 60 determines whether or not the vehicle 9 existing in the gate front area 32 satisfies entry requirements for the parking area 10 (hereinafter simply referred to as entry requirements). In the present embodiment, the following requirements (i) and (ii) are defined as entry requirements. If the entry requirements are not satisfied, entry of the vehicle 9 into the parking area 10 is not permitted, and entry of the vehicle 9 into the parking area 10 is restricted.

(i) The type of the AVP system provided in the vehicle 9 must match the type of the AVP system provided in the automatic valet parking facility 1. (ii) The dynamic estimation accuracy of the vehicle 9 satisfies a predetermined reference accuracy.

Specifically, at A10, the control device 60 determines whether the vehicle 9 satisfies the entry requirements based on the information corresponding to the identification information of the vehicle 9 obtained at A9 (that is, the information (a) described above) from among the obtained-in-advance information. The obtained-in-advance information refers to information already recorded in the memory 612, that is, information recorded in the memory 612 in advance. More specifically, the control device 60 refers to the above-described information (b) of the vehicle 9 existing in the gate front area 32 based on the information (a) obtained at A9 and the information (a) obtained in advance at A2, to determine whether the vehicle 9 satisfies the entry requirements. The control device 60 determines whether the vehicle 9 satisfies the above-described requirement (i) based on the information indicating the type of the AVP system provided in the vehicle 9 (that is, the information (b) described above) corresponding to the above-described information (a) obtained at A9. Further, the control device 60 determines whether the vehicle 9 satisfies the requirement (ii) described above based on the information indicating the dynamic estimation accuracy corresponding to the above-described information (a) obtained at A9.

If it is determined at A10 that the vehicle 9 existing in the gate front area 32 does not satisfy the entry requirements, that is, does not satisfy at least one of the requirements (i) and (ii), the processing of A11 to A15, which is described later, is performed. On the other hand, if it is determined at A10 that the vehicle 9 existing in the gate front area 32 satisfies the entry requirements, that is, satisfies both of the requirements (i) and (ii), the processes of A16 to A32, which is described later, are performed.

In the present embodiment, since the requirements (i) and (ii) are defined as the entry requirements, the control device 60 requests, at A2, for transmission of the information (a) to (d) described above to the vehicle 9. However, if only one of the requirements (i) and (ii) described above, or other requirements are defined as an entry requirement or requirements, the request for transmission of the required information may be transmitted to the vehicle 9 at A2, that is, for example, as a request for the information required for determining whether the requirement is satisfied, such as only part of the information (a) to (d).

At A11, the control device 60 instructs the display device 83 included in the infrastructure 80 to provide a do-not-enter display to the user in the vehicle 9 existing in the gate front area 32. The do-not-enter display is a display indicating that entry into the parking area 10 is not permitted. The do-not-enter display corresponds to notification regarding entry restriction to the parking area 10.

At A12, the display device 83 provides the do-not-enter display to the user in the vehicle 9 existing in the gate front area 32. Specifically, the display device 83 displays an image prompting the user to head for the general parking facility instead of the parking area 10. The display device 83 may display an image indicating that the vehicle cannot enter the parking area 10.

At A13, the control device 60 instructs the gate device 84 included in the infrastructure 80 to change the open/close state of the gate 50. Specifically, the control device 60 instructs the gate device 84 to open the closed gate 50, and then instructs to close the gate 50 after the vehicle 9 has passed therethrough.

At A14, the gate device 84 changes the open/close state of the gate 50 according to the instruction from the control device 60. At A15, the vehicle 9 that has passed through the gate 50 exits from the automatic valet parking facility 1 through the fork road 40 and enters the general parking facility.

Figure 4:
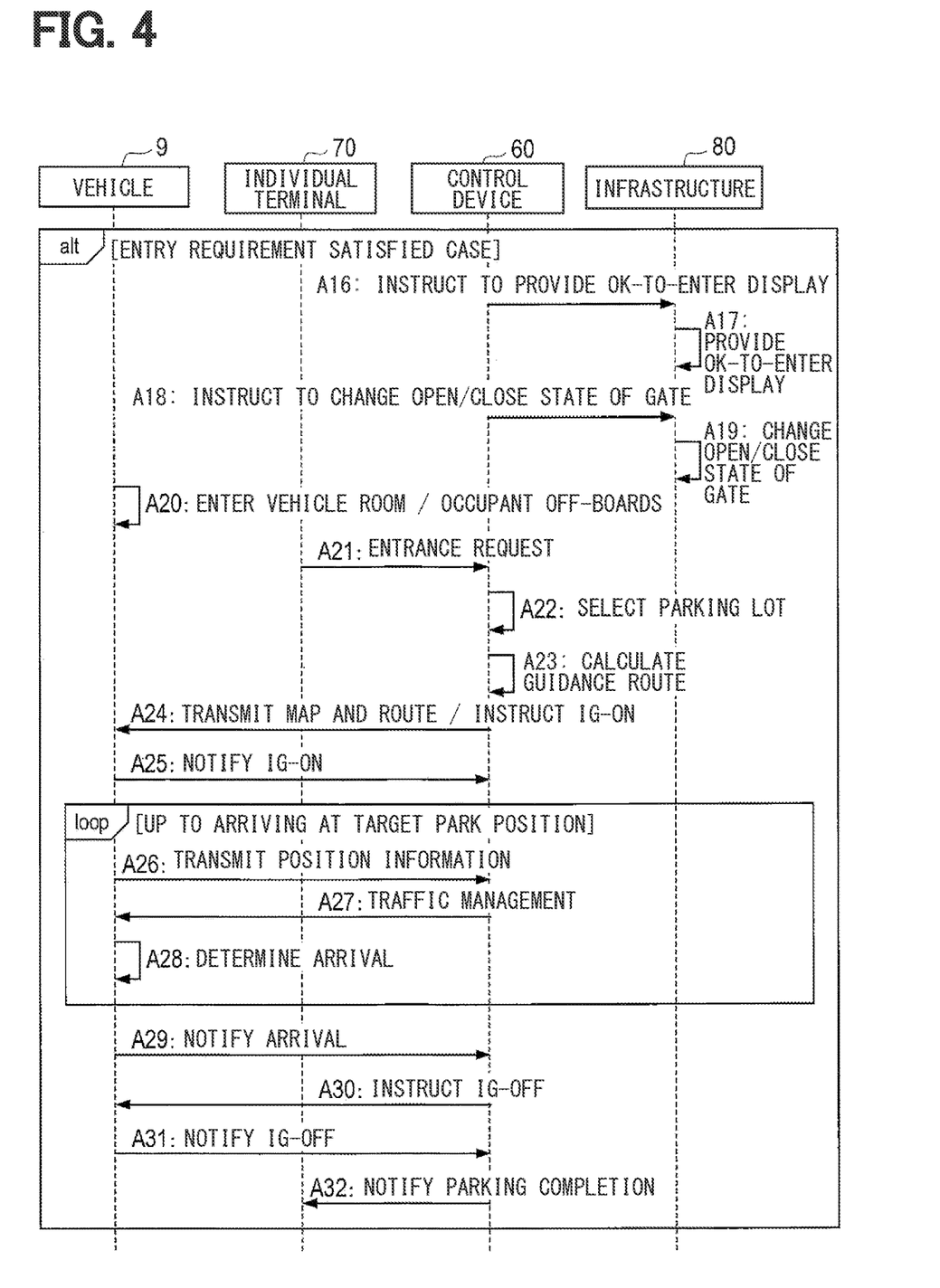
FIG. 4 is another sequence diagram showing the parking process performed by the control system and the vehicle.

At A16 shown in FIG. 4, the control device 60 instructs the display device 83 included in the infrastructure 80 to provide an OK-to-enter display to the user in the vehicle 9 existing in the gate front area 32. The OK-to-enter display is a display indicating that entry into the parking area 10 is permitted. The OK-to-enter display also corresponds to notification regarding entry restriction to the parking area 10.

At A17, the display device 83 provides the OK-to-enter display to the user in the vehicle 9 existing in the gate front area 32. Specifically, the display device 83 displays an image prompting the user to enter one of the vehicle rooms 20. The display device 83 may display an image showing a vehicle room 20 into which the vehicle 9 should enter. The image showing a vehicle room 20 into which the vehicle 9 should enter may be, for example, an image showing a position of the vehicle room 20 into which the vehicle 9 should enter, or an image showing a compartment number corresponding to the vehicle room 20 into which the vehicle 9 should enter.

At A18, the control device 60 instructs the gate device 84 included in the infrastructure 80 to change the open/closed state of the gate 50 in the same manner as the one at A13 described above. At A19, the gate device 84 changes the open/close state of the gate 50 according to the instruction from the control device 60.

At A20, the vehicle 9 that has passed through the gate 50 enters one of the plurality of vehicle rooms 20 through the dedicated road 30 and stops. Then, the user gets off from the vehicle 9. After getting off from the vehicle 9, the user inputs information to the individual terminal 70. The information input here includes an entrance request for entering into the parking lot 11. Note that the user may input the information into the smartphone that the user him/herself carries. In such case, the information input to the smartphone is input to the control device 60 through wireless communication between the smartphone and the control device 60 or via a mobile phone communication network of the smartphone and the server.

At A21, the individual terminal 41 transmits the information input by the user to the control device 60. Note that the smartphone may transmit the information input by the user to the control device 60. The control device 60 receives information input by the user from the individual terminal 41 or the smartphone.

At A22, the control device 60 selects a parking lot 11 to guide the vehicle 9 to. Hereinafter, the parking lot 11 selected at A22 is referred to as a target park position. At A23, the control device 60 calculates a guidance route to the target park position.

At A24, the control device 60 transmits to the vehicle 9 the map information of the parking area 10 and the guidance route calculated at A23. The vehicle 9 receives the map information of the parking area 10 and the guidance route. The control device 60 also transmits an ignition-on instruction to the vehicle 9. The ignition-on instruction is an instruction for turning on an ignition of the vehicle. The vehicle 9 turns on the ignition in response to the ignition-on instruction.

At A25, the vehicle 9 transmits an ignition-on notification to the control device 60. The ignition-on notification indicates that the ignition of the vehicle has been turned on. At A26, the vehicle 9 performs automated driving toward the target park position, and transmits current position information indicating a current position of the vehicle 9 to the control device 60. The current position of the vehicle 9 is a current position of the vehicle 9 estimated by the vehicle 9 itself. The control device 60 receives the current position information from the vehicle 9.

At A27, the control device 60 performs traffic management based on the current position information received at A26. The control device 60 instructs the vehicle 9 to stop, start and reroute as required. The vehicle 9 stops, starts and reroutes according to the instructions.

At A28, the vehicle 9 determines whether the vehicle 9 itself has arrives at the target park position. If it is determined at A28 that the vehicle 9 has not yet arrived at the target park position, the process returns to A26. If it is determined at A28 that the vehicle 9 has arrived at the target park position, the process proceeds to A29.

At A29, the vehicle 9 transmits an arrival notification to the control device 60. The arrival notification is a notification indicating that the vehicle 9 has arrived at the target park position. Control device 60 receives an arrival notification from vehicle 9.

At A30, the control device 60 transmits an ignition off instruction to the vehicle 9. The ignition off instruction is an instruction for turning off the ignition of the vehicle. The vehicle 9 turns off the ignition in response to the ignition off instruction.

At A31, the vehicle 9 transmits an ignition off notification to the control device 60. The ignition off notification is a notification indicating that the ignition has been turned off. The control device 60 receives the ignition off notification from the vehicle 9.

At A32, the control device 60 transmits a parking completion notification to the individual terminal 70. The parking completion notification is a notification indicating that the parking of the vehicle 9 in the parking lot 11 has been completed. Note that the control device 60 may transmit the parking completion notification to the smartphone. When the parking completion notification is transmitted from the control device 60, the process ends.

Next, the pre-parking process performed by the control device 60 at A2 to A18 described above is described with reference to FIG. 5. The control device 60 repeats S101 described below. In S101, the control device 60 requests the vehicle 9 that has reached the position estimation area 31 to transmit information. The information requested here includes the above-described information (a) to (d). S101 corresponds to the processing of A2 described above.

Figure 5:
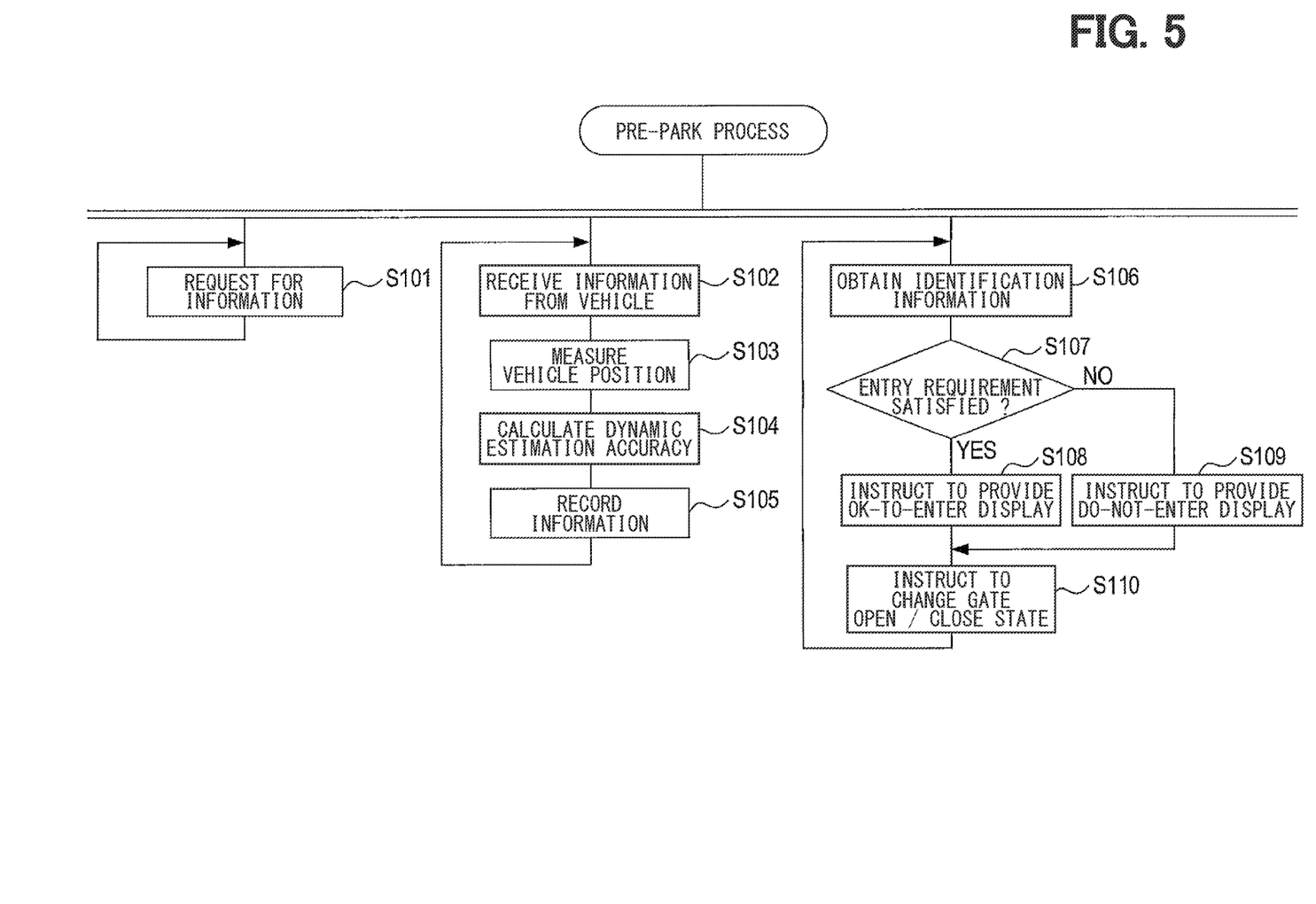
FIG. 5 is an activity diagram showing a pre-parking process performed by a control device.

In parallel with S101, the control device 60 repeats the following S102 to S105. In S102, the control device 60 receives the above-described information (a) to (d) from the vehicle 9. S102 corresponds to the processing of A4 described above.

In S103, the control device 60 measures the position of the vehicle 9 traveling in the position estimation area 31. S103 corresponds to the processing of A5 described above.

In S104, the control device 60 calculates the dynamic estimation accuracy based on the information (c) received in S102 and the position of the vehicle 9 measured in S103. S104 corresponds to the processing of A6 described above.

In S105, the control device 60 records the information (b) received in S102 and the information indicating the dynamic estimation accuracy calculated in S104 in the memory 612 in association with the information (a) received in S102. S105 corresponds to the processing of A7 described above.

In parallel with S101 to S105, the control device 60 repeats the following S106 to S110. In S106, the control device 60 uses the road camera 81 to capture an image of the license plate of the vehicle 9 existing in the gate front area 32, and obtains the identification information of the vehicle 9 (that is, the information (a) described above). S106 corresponds to the processing of A9 described above.

In S107, the control device 60 determines whether the vehicle 9 existing in the gate front area 32 satisfies the entry requirements. Specifically, among the obtained-in-advance information, based on the information (b) described above and the information indicating the dynamic estimation accuracy respectively corresponding to the above-described information (a) obtained in S106, the control device 60 determines whether the vehicle 9 existing in the gate front area 32 satisfies both of the above-described requirements (i) and (ii). S107 corresponds to the processing of A10 described above.

When it is determined in S107 that the vehicle 9 existing in the gate front area 32 satisfies the entry requirements, the control device 60 instructs, to the display device 83, to provide an OK-to-enter display to the user in the vehicle 9 existing in the gate front area 32 in S108. S108 corresponds to the processing of A16 described above.

On the other hand, if it is determined in S107 that the vehicle 9 existing in the gate front area 32 does not satisfy the entry requirements, the control device 60 instructs, to the display device 83, to provide a do-not-enter display to the user in the vehicle 9 existing in the gate front area 32 in S109. S109 corresponds to the processing of A11 described above.

When the processing of S108 or S109 ends, the control device 60 instructs the gate device 84 to change the open/closed state of the gate 50 in S110. S110 corresponds to the processing of A13 and A18 described above.

3. Advantageous Effects

The above-described embodiment achieves the following effects. (3a) The control device 60 performs, to the user in the vehicle 9 existing in the gate front area 32, an action according to the information that corresponds to the identification information of the vehicle 9 existing in the gate front area 32 among the type information of the AVP system in the vehicle 9 and the information of the dynamic estimation accuracy that have already been obtained.

According to such a configuration, the control device 60 can identify to which of the previously obtained characteristics information the vehicle 9 existing in the gate front area 32 corresponds. Therefore, when the characteristics information of the vehicle 9 is obtainable in advance, the control device 60 can perform or provide, to the user in the vehicle 9 existing in the gate front area 32, an action according to the characteristics of the vehicle 9. Further, since the characteristics information is obtained in advance, the control device 60 can quickly determine whether or not the vehicle 9 existing at a specific position can enter the parking area 10.

(3b) The control device 60 obtains the characteristics information and the identification information of the vehicle 9 from the vehicle 9 by wireless communication. According to such a configuration, the control device 60 can perform or provide, to the user in the vehicle 9 existing in the gate front area 32, for example, an action according to the characteristics of the vehicle 9, based on the characteristics information of the vehicle 9 in a traveling state.

(3c) The control device 60 provides, or more specifically displays, notification of the entry restriction to the parking area 10 as an action according to the characteristics of the vehicle 9. According to such a configuration, in the gate front area 32, that is, at a position before the parking area 10, it is possible to notify the user in the vehicle 9 of the restriction on entering the parking area 10, thereby enabling smooth operation of the automatic valet parking facility 1. In the above-described embodiment, S102 corresponds to processing as an in-advance obtainment unit, S106 corresponds to processing as a specific obtainment unit, and S108 to S110 correspond to processing as an action unit.

4. Other Embodiments

Although the embodiments of the present disclosure have been described above, the present disclosure is not limited to the embodiments described above, and various modifications can be made to implement the present disclosure.

(4a) In the above-described embodiments, the automatic valet parking facility 1 includes one gate 50 and one gate front area 32. However, for example, the automatic valet parking facility 1 may include multiple gates 50 and multiple gate front areas 32.

(4b) In the above-described embodiments, the control device 60 uses the road camera 82 to obtain the identification information of the vehicle 9 existing in the gate front area 32. However, the method by which the control device 60 obtains the identification information of the vehicle 9 existing in the gate front area 32 is not limited to the above. The control device 60 may obtain the identification information of the vehicle 9 existing in the gate front area 32 using, for example, a short-range communication device included in the infrastructure 80. The short-range communication device mentioned here is a device that includes the area in front of the gate 32 as a communicable area.

For example, when the automatic valet parking facility 1 includes a plurality of gate front areas 32, it is conceivable that the gate front areas 32 are provided adjacent to each other. Even in such a case, by using the short-range communication device included in the infrastructure 80, or by using the road camera 82 as In the above-described embodiment, the control device 60 can obtain the identification information of the vehicle 9, without confusion regarding the vehicle 9 existing in an adjacent gate front area 32.

(4c) In the above-described embodiments, the control device 60 obtains, from the vehicle 9, the information on the vehicle 9 through wireless communication before the vehicle 9 reaches the gate front area 32. However, the method by which the control device 60 obtains the information on the vehicle 9 in advance is not limited to wireless communication from the vehicle 9. That is, wireless communication from a mobile terminal such as a smartphone or the like may also be usable as such a method, for example. Further, for example, when a terminal capable of wired communication with the control device 60 is provided on the route to the parking area 10 and the information of the vehicle 9 is input to such terminal, the control device 60 may obtain the information on the vehicle 9 via the wired communication from the terminal.

(4d) In the above-described embodiments, the control device 60 obtains information indicating the vehicle identification number of the vehicle 9 as the identification information of the vehicle 9. However, the identification information of the vehicle 9 is not limited to the above. For example, when the control device 60 obtains the identification information of the vehicle 9 using the imaging device as In the above-described embodiments, the identification information of the vehicle 9 may be other factors/elements recognizable from an appearance of the vehicle 9, such as size, color, and type of the vehicle 9, and the like. Further, for example, when the control device 60 obtains the identification information of the vehicle 9 using a short-range communication device included in the infrastructure 80, the identification information of the vehicle 9 may be information indicating an ID assigned to the vehicle 9 in the control system 6, or may be information indicating an entry reservation number or the like.

(4e) In the above-described embodiments, the control device 60 obtains, as the characteristics information of the vehicle 9, information indicating the type of the AVP system provided in the vehicle 9, and information on the position of the vehicle 9 itself estimated by the vehicle 9 in the traveling state. Then, the control device 60 restricts the entry of the vehicle 9 into the parking area 10 based on these pieces of information, i.e., depending on whether the above requirements (i) and (ii) are satisfied.

However, the characteristics information of the vehicle 9 is not limited to the information exemplified in the above-described embodiments. The characteristics information of the vehicle 9 may be, for example, information indicating whether or not there is a reservation for the vehicle 9 to enter the parking area 10, a size of the vehicle 9, a remaining amount of gasoline in the vehicle 9, and the like. Further to the requirements (i) and (ii) described above, or in place of at least one of the requirements, for example, a requirement may be defined as (a) a reservation of the vehicle 9 has been done for parking in the parking area 10, (b) the size of the vehicle 9 is smaller than a predetermined value, (c) the remaining amount of gasoline in the vehicle 9 is equal to or greater than a predetermined reference amount, or the like. The control device 60 may determine the entry restriction of the vehicle 9 into the parking area 10 depending on whether or not the set requirements are satisfied. For example, the control device 60 may restrict entry into the parking area 10 of a vehicle 9 that has not made a parking reservation, or may restrict entry into the parking area 10 of a vehicle 9 that does not satisfy criteria such as size or remaining amount of gasoline.

(4f) In the above-described embodiments, the control device 60 determines whether or not the vehicle 9 can enter the parking area 10 based on the characteristics information of the vehicle 9 obtained in advance, that is, whether or not there is a restriction on the entry of the vehicle 9 into the parking area 10. However, the control device 60 may determine, for example, a degree of restriction on entry of the vehicle 9 into the parking area 10. Specifically, for example, if only a part of the parking area 10 accommodates a large vehicle, the control device 60 may determine an area in the parking area 10 where the vehicle 9 can be parked according to the size of the vehicle 9.

(4g) In the above-described embodiments, the control device 60 determines whether the vehicle 9 existing in the gate front area 32 satisfies the entry requirements. That is, after the vehicle 9 reaches the gate front area 32, the control device 60 determines whether the vehicle 9 satisfies the entry requirements. However, the control device 60 may determine whether the vehicle 9 satisfies the entry requirements before the vehicle 9 reaches the gate front area 32. Specifically, after (a) requesting the vehicle 9 that has reached at the position estimation area 31 to transmit information and (b) obtaining the information from the vehicle 9, the control device 60 may determine whether the vehicle 9 satisfies the entry requirements during a time when the vehicle 9 leaving from the position estimation area 31 travels toward the area 32. Then, the control device 60 may record the determination result in the memory 612 in association with the identification information of the vehicle 9 obtained in advance from the vehicle 9.

According to such a configuration, when the vehicle 9 reaches the gate front area 32, since the determination results have already been issued, as soon as obtaining the identification information of the vehicle 9 existing in the gate front area 32, the control device 60 can perform an action, according to the determination result corresponding to the identification information among the determination results recorded in the memory 612. That is, the automatic valet parking facility 1 can be operated smoothly.

(4h) In the above-described embodiment, the gate 50 is provided at a position before the branch point to the fork road 40 on the dedicated road 30. However, for example, the gate 50 may be positioned after the branch point, that is, it may be provided at a position closer to a plurality of vehicle rooms 20 than the branch point. Specifically, for example, the gate front area 32 may be configured to serve as a branch point to the fork road 40.

According to such a configuration, even when the gate 50 is closed, the vehicle 9 can be directed to the general parking facility by providing a do-not-enter display. Therefore, the gate 50 may be opened only when the entry requirements are satisfied, and the gate 50 may be kept closed when the vehicle 9 does not satisfy the entry requirements. In other words, it is possible to forcibly restrict the entry into the parking area 10 of the vehicle 9 that does not satisfy the entry requirements, without leaving it to the autonomy of the user who drives the vehicle 9. It should be noted that the gate 50 in such a configuration corresponds to a gate capable of physically restricting entry of the vehicle 9 into the parking area 10.

(4i) In the above-described embodiments, the gate 50 has a structure capable of physically restricting the vehicle 9 from traveling, specifically, a bar or the like. However, the gate 50 may also be configured as an image projected onto a road surface or into space, for example. In such case, a state in which the gate 50 is open and a state in which the gate 50 is closed are represented by characters (for example, characters indicating that parking is possible and parking is not possible) or graphics (for example, an arrow pointing to the vehicle room 20, an image of a wall or the like), or the like. By using such an image, it is possible to notify the user who is driving the vehicle 9 of entry restrictions to the parking area 10 in various expressions.

(4j) In the above-described embodiment, the automatic valet parking facility 1 is provided with the gate 50. However, it may also be configured as a gateless facility. Further, a configuration may be adopted in which the vehicle 9 does not stop temporarily in the gate front area 32. In such case, the control device 60 performs, for the vehicle 9 passing through the gate front area 32, an action according to the characteristics information of the vehicle 9, which may be, for example, a notification. Since the control device 60 obtains the characteristics information of the vehicle 9 before the vehicle 9 reaches the gate front area 32, the control device 60 can smoothly pass the vehicle therethrough, compared to a situation in which the control device 60 obtains the characteristics information of the vehicle 9 only after the vehicle 9 reaches the gate front area 32. That is, the automatic valet parking facility 1 can be operated smoothly.

(4k) In the above-described embodiments, the control device 60 obtains the identification information of the vehicle 9 in each of the position estimation area 31 and the gate front area 32. However, when tracking the vehicle 9 from the position estimation area 31 to the gate front area 32, for example, the control device 60 can still identify the identification information of the vehicle 9 existing in the gate front area 32 without obtaining the identification information of the vehicle 9 in the gate front area 32. Methods for the control device 60 to track the vehicle 9 include a method of continuously detecting the vehicle 9 by using a lidar or the like included in the infrastructure 80, a method of continuously obtaining current position information from the vehicle 9, and the like.

(4l) The function of one component in the above-described embodiment may be distributed as a plurality of components, or the functions of a plurality of components may be integrated into one component. A part of the configuration of the embodiment may be omitted as appropriate. At least a part of the configuration of each of the embodiments described above may be added to, or replaced with another configuration of the embodiment described above, or the like.

(4m) Further to the control device 60 described above, the present disclosure may be realized in various forms such as the control system 6 having the control device 60 as a component, a program for causing a computer to function as the control device 60, and a medium recording such a program, or the like.

What is claimed is:

1. A control device for an automatic valet parking facility, the control device comprising:
    an in-advance obtainment unit configured to obtain, before a vehicle arrives at a specific position on a route to a parking area where automated driving for parking is performed according to a guidance of the control device, (i) characteristics information indicating characteristics of the vehicle that is about to enter the parking area and (ii) identification information of the vehicle;
    a specific obtainment unit configured to obtain the identification information from the vehicle located at the specific position;
    a determination unit configured to determine based on the characteristics information, whether the vehicle satisfies an entry requirement to the parking area, and
    an action unit configured to perform an action for a driver of the vehicle located at the specific position according to the characteristics information, among the characteristics information that has been obtained, corresponding to the identification information obtained from the vehicle located at the specific position,
    wherein
    the action unit instructs a display device installed at a position visible to the driver of the vehicle located at the specific position to display an indication, and
    the action unit, when the vehicle satisfies the entry requirement, instructs the display device to display an entry-possible indication, and when the vehicle does not meet the entry requirements, instructs the display device to display an entry-not-possible indication.

2. The control device according to claim 1, wherein
the action unit is further configured to refer to the characteristics information of the vehicle located at the specific position based on (a) the identification information obtained by the specific obtainment unit from the vehicle located at the specific position and (b) the identification information that has been obtained by the in-advance obtainment unit from the vehicle.

3. The control device according to claim 1, wherein
the specific obtainment unit is configured to obtain the identification information from the vehicle located at the specific position using (a) an imaging device configured to image the vehicle located at the specific position or (b) a short-range communication device having a communicable area covering the specific position.

4. The control device according to claim 1, wherein
the in-advance obtainment unit is configured to obtain, from the vehicle, the characteristics information and the identification information of the vehicle via wireless communication.

5. The control device according to claim 1, wherein
the in-advance obtainment unit is configured to obtain, as the characteristics information, information indicating a type of an automatic valet parking system installed in the vehicle.

6. The control device according to claim 1, wherein
the in-advance obtainment unit is configured to obtain, as the characteristics information, (a) information indicating a position of the vehicle estimated by the vehicle when the vehicle is traveling in a position estimation area that is an area on the route for measuring a position of the vehicle by the control device and (b) information indicating a time when the vehicle was located at the position estimated by the vehicle.

7. The control device according to claim 6, wherein
the specific position is a passing point through which the vehicle passes after the vehicle passed through the position estimation area.

8. The control device according to claim 1, wherein
the action unit is configured to provide, as the action, a notification regarding a restriction to an entry into the parking area.

9. The automatic valet parking facility, comprising:
the control device according to claim 1; and
a gate configured to restrict an entry into the parking area by the vehicle, wherein
the action unit is configured to change, as the action, an open/close state of the gate.

10. A method for performing an action according to characteristics of a vehicle, the method being implemented by a control device for an automatic valet parking facility, the method comprising:
before the vehicle arrives at a specific position on a route to a parking area where automated driving for parking is performed according to a guidance of the control device, obtaining (i) characteristics information indicating characteristics of the vehicle that is about to enter the parking area and (ii) identification information of the vehicle;
obtaining the identification information from the vehicle located at the specific position;
determining based on the characteristics information, whether the vehicle satisfies an entry requirement to the parking area; and
performing an action for a driver of the vehicle located at the specific position according to the characteristics information, among the characteristics information that has been obtained, corresponding to the identification information obtained from the vehicle located at the specific position,
wherein
the performing includes instructing a display device installed at a position visible to the driver of the vehicle located at the specific position to display an indication, and
the performing includes instructing the display device to display an entry-possible indication when the vehicle satisfies the entry requirement, and instructing the display device to display an entry-not-possible indication when the vehicle does not meet the entry requirements.

11. A control device for an automatic valet parking facility, the control device comprising at least one processor programmed to:
obtain, before a vehicle arrives at a specific position on a route to a parking area where automated driving for parking is performed according to a guidance of the control device, (i) characteristics information indicating characteristics of the vehicle that is about to enter the parking area and (ii) identification information of the vehicle;
obtain the identification information from the vehicle located at the specific position;
determine based on the characteristics information, whether the vehicle satisfies an entry requirement to the parking area; and
perform an action for a driver of the vehicle located at the specific position according to the characteristics information, among the characteristics information that has been obtained, corresponding to the identification information obtained from the vehicle located at the specific position,
wherein
the performing includes instructing a display device installed at a position visible to the driver of the vehicle located at the specific position to display an indication, and
the performing includes instructing the display device to display an entry-possible indication when the vehicle satisfies the entry requirement, and instructing the display device to display an entry-not-possible indication when the vehicle does not meet the entry requirements.

* * * * *